March 12, 1968 H. R. PEIFFER ETAL 3,372,476

METHOD OF MAKING PERMANENT CONNECTIONS BETWEEN INTERFITTING PARTS

Original Filed Jan. 18, 1966

United States Patent Office 3,372,476

Patented Mar. 12, 1968

3,372,476

METHOD OF MAKING PERMANENT CONNECTIONS BETWEEN INTERFITTING PARTS

Howard Richard Peiffer, New Cumberland, and Thomas James Schuetz, Camp Hill, Pa., assignors to AMP Incorporated, Harrisburg, Pa.

Continuation of application Ser. No. 521,337, Jan. 18, 1966. This application Apr. 5, 1967, Ser. No. 628,781
1 Claim. (Cl. 29—628)

ABSTRACT OF THE DISCLOSURE

Invention discloses method of forming permanent connection between interfitting parts, the parts having a surface of material selected from the group consisting of copper, copper alloys, gold, and silver. In accordance with the method, one of the parts is coated with indium to a thickness in the range of 20 microinches to 150 microinches. The parts are engaged with each other and allowed to stand at room temperature. Permanent connection is achieved within a short time by keying mechanism resulting from the growth of an intermetallic compound which is formed at room temperature and which is stable at room temperature.

*Background of the invention*

Figure 1:
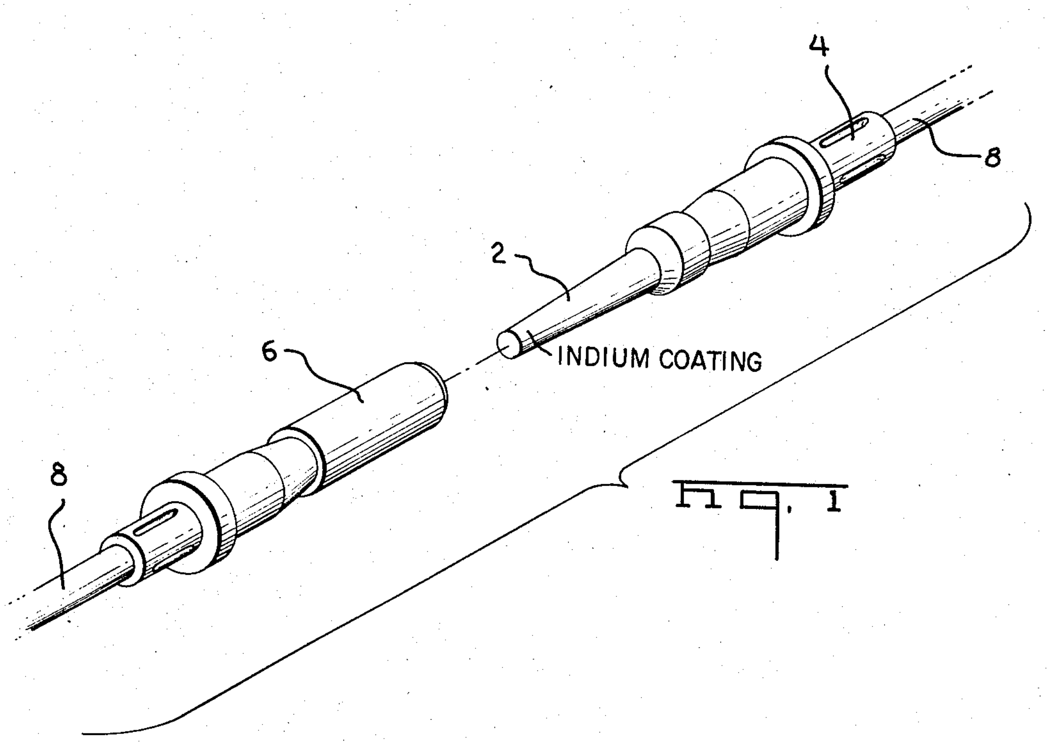

This application is a continuation of application Ser. No. 521,337, filed Jan. 18, 1966, and now abandoned.

This invention relates to a method of making permanent or semi-permanent connections between interfitting parts of the type which are in intimate contact with each other after engagement. The invention is herein disclosed and described in an embodiment relating to electrical connections although it will be apparent that the invention can be used in other types of connections.

Frequently, electrical connections between conductors are made by means of interengageable terminals crimped or otherwise secured to the ends of wires. This technique is often used, for example, in wiring appliances or in wiring the electrical circuits of an automobile. The numerous conductors required are provided in the form of previously made up harnesses having terminals on their ends so that in the final assembly operation, the terminals need only be engaged with the terminals on the various electrical devices on the machine or vehicle. After the terminals have been engaged with each other, the connections, in effect, function as permanent or semi-permanent connections since it is not contemplated that these connections will be broken during the ordinary use of the device. Therefore, it would be desirable to provide a means for permanently bonding or securing together the two terminals in order to increase the reliability of the electrical circuits involved. The bonding or permanent joining of the terminals should not be instantaneous however, (i.e., the two terminals should not be permanently bonded or joined immediately after they are initially engaged) for the reason that minor changes might be required as a result of mistakes in assembly during the final wiring operation. The bonding or permanent joining should, however, be effective after inspection and/or testing of the electrical circuits involved.

It is accordingly an object of the invention to provide an improved method of making electrical connections. A further object is to provide a method of imparting permanency to disengageable electrical connections. A further object is to provide a method of permanently joining disengageable connecting devices with each other which does not become effective until after the parts have been bonded for a short time interval.

These and other objects of the invention are achieved in one embodiment by utilizing contact terminals on the ends of wires which are engageable with each other. Prior to engagement, at least one of the terminals is coated, as by electro plating, with a thin but effective coating of metallic indium. The thickness of this coating is, in accordance with a preferred embodiment of the invention, limited to the range of about 20 to 150 microinches although thicker or thinner coatings will frequently achieve the objects and results of the invention. The terminals are then engaged with each other and allowed to remain undisturbed for a period of several hours. Immediately after coupling or engagement, the terminals can be disengaged from each other to permit any necessary changes in wiring which might be indicated by testing of the circuits and to correct any mistakes which might have been made in the wiring. After the parts have remained undisturbed for a period of hours or days (depending upon the thickness of the indium), they will become permanently connected to a degree such that the force required to separate them is several times the force which would be required with unplated terminals.

Figure 2:
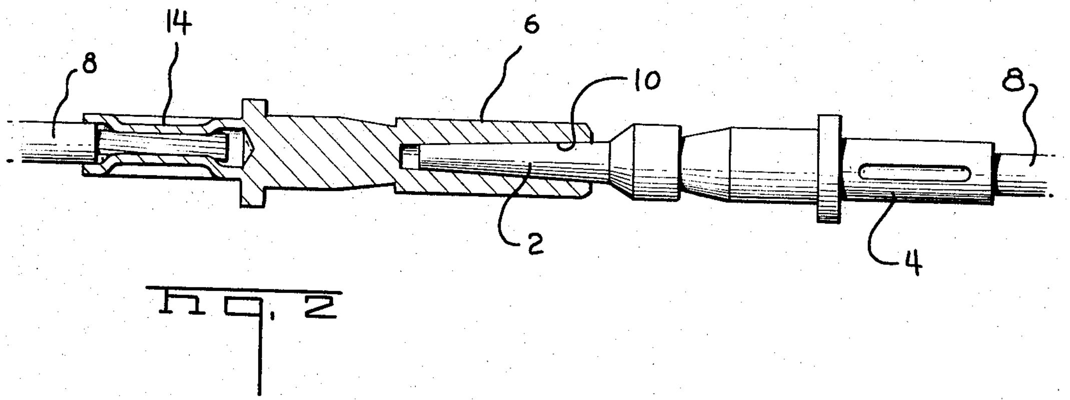

In the drawing:

FIGURE 1 is a perspective view of a taper pin, terminal, and a complementary socket of a general type commonly used to make electrical connections between wires; and FIGURE 2 is a side view with parts broken away of the taper pin and socket of FIGURE 1 showing the parts in engagement with each other.

The invention can be practiced with many different types of disengageable terminals so long as the surfaces of the terminals are against each other and in intimate contact when they are engaged with each other. The invention will herein be described with reference to the types of terminals shown in FIGURES 1 and 2 since taper pin connections of this type are widely used to make electrical connections between wires under circumstances where the connections function as permanent connections after they are made.

The engageable terminals of FIGURE 1 comprise a taper pin 2 and a complementary socket 6 having a tapered opening 10. In connections of this type, the angle of taper of the pin and the corresponding taper angle of the socket is relatively small, about three degrees, and it has been found that if the parts are properly engaged with each other, a good electrical connection will result and a substantial tensile force will be required to disengage the parts. The rearward ends of the terminals 4 are crimped onto the stripped ends of wires 8 as shown at 14, an operation which may be carried out by automatic lead-making machines. The terminals will usually be made of copper, brass, or other copper alloy but may be of other suitable conductive metal. The terminals may be plated with relatively thin platings for purposes of corrosion resistance or improved electrical characteristics. Gold and silver are commonly used for this purpose but other metals might be used as explained below.

One conventional size of taper pin intended for wires is in the range of AWG 16–20. The taper pin is about 0.535 inch long and is inserted into the socket by means of an insertion tool which delivers an impact blow to the pin at the time of insertion. When a taper pin is properly inserted by such an impact tool, a force of about 30–40 pounds is required to disengage the parts.

In accordance with the principles of the invention, a relatively thin but effective coating of metallic indium is provided on the surface of the taper pin 2. Alternatively, the coating of indium can be provided on the internal surface of the socket; however, it is always more difficult to plate an internal surface than an external surface and for this reason, it is preferred that the indium be plated on the surface of the taper pin. The parts are engaged with each other and permitted to stand for a period of several hours. The parts will then be permanently connected to an extent such that a tensile force of about 100–150 pounds is required to disengage the pin from the socket. This permanent bonding, the mechanism of which is discussed below, will take place at room temperature and its achievement will be accelerated if the parts are heated slightly above room temperature, say 80° C. such heating, however, is not necessary under ordinary circumstances and need not be resorted to in order to achieve the results of the invention.

While the precise mechanism which results in the permanent connection of the pin 2 to the socket 6 is not completely understood, there is evidence indicating that the indium penetrates the base metal of the parts and forms an intermetallic compound. After the reaction between the indium and the base metal has proceeded to partial completion, the surfaces of the parts will thus be covered with an irregular, relatively rough, coating of intermetallic compound. The coatings of the two parts will be interengaged with each other, at least some of the projecting portions or "peaks" of the coating on one part extending between the projecting portions and into the "valleys" of the other part. As a result, the two parts will be held by a keying effect developed after they were initially engaged. This keying effect will increase the strength of the union to some extent after the indium base metal reaction is only partially completed. The strength of the joining will be further increased as the reaction proceeds and the height of the "peaks" on the parts is increased.

In order for the intermetallic compound to perform its keying or locking function, the surfaces of the two parts must be in intimate contact with each other. This condition of close or intimate contact exists with the taper pin and the socket of FIGURE 1 and may be achieved in a wide variety of other parts. For example, the principles of the invention might be used to join a wire to a terminal if the wire has an extremely close fit in the ferrule of the terminal.

It has been found that if the indium coating is relatively thin as described below, it can be applied to the terminal long before the terminals are engaged with each other and the benefits of the invention will nonetheless be achieved. This fact would indicate that the formation of the indium copper intermetallic compound does not take place, or at least does not proceed at a high reaction rate, until the parts are engaged with each other. A possible explanation for this phenomenon is that diffusion of the indium can take place in two directions (into the taper pin and into the socket) after engagement of the pin with the socket.

The terminals may be of a metal other than copper or copper alloys if the metal will react with the indium to form a suitable intermetallic compound as described above. The terminals may also be plated with a metal capable of reacting with indium to form the intermetallic compound. Gold and silver, for example, are two possible metals which might be plated on the base metal. Finally, the terminals may be of a base metal which does not form a suitable intermetallic compound or of a suitable non-conductor or semi-conductor and be plated with a conductive metal which does form the intermetallic compound as described, and for the reasons stated, above.

The indium coating, as previously noted, is advantageously relatively thin. Good results are obtained with coatings having a thickness as low as about 25 microinches and with coatings having a thickness as high as about 150 microinches. Good results can also be obtained where the thickness of the indium is greater than about 150 microinches although, generally speaking, the thicker the indium coating, the longer the time interval required at a given temperature for the bond between the terminals to become permanent. For example, it has been found that if the indium coating has a thickness of 24 microinches, the bond strength will be increased severalfold after one hour of engagement of the parts and additional aging of the bond up to periods of one thousand hours results in only slight further increase in the strength of the bond. Where the thickness of the indium is about 53 microinches, a substantial improvement in the strength of the bond will be achieved in six hours and additional aging will result in further improvement although the maximum strength achieved does not necessarily substantially exceed the maximum strength achieved with a 24 microinch coating after twenty hours. If the thickness of the indium coating is 111 microinches, very little improvement in the strength of the joint is achieved at the end of twenty-four hours and it is only after about four hundred hours that a significant improvement is achieved. The foregoing generalizations are based on observations of joints made with free machining brass taper pins made of the type in FIGURE 1 and data supporting these statements are set forth in Table I.

It will be apparent from the data of Table I that under the circumstances of the tests reported in FIGURE 1, optimum results are obtained where the indium coating has a thickness in the range of about 20–150 microinches. It has been found that improved results, although not necessarily optimum results, are achieved with thicker coatings. In general, the efficacy of the indium as a bonding agent decreases when a thickness of 150 microinches is passed so that further increase in the indium thickness tends to retard the speed of the reaction.

The phrase "thin but effective" plating or coating of indium is advisedly chosen to refer to the range of coatings which will produce the end result of the invention under conditions deemed by the user to be optimum. Thus, if one practicing the invention wishes to achieve a permanent bond or connection in as short a time as possible after the pin is engaged with the socket, he should employ an extremely thin coating (about 25 microinches) of indium since he will achieve a permanent connection within a very short time. If, on the other hand, it is desired to delay the achievement of the permanent connection until about one thousand hours after the parts are engaged with each other, he can provide indium coating of about 150 or more microinches in thickness. Under some circumstances, a delay of one thousand hours between engagement of the parts and an achievement of the permanent connection might be desirable if, for example, the inspection and checking procedures of the device being bonded require several weeks after assembly. An indium coating of appropriate thickness under such circumstance would permit changes in the circuitry after the inspection procedures had been completed.

It should be mentioned that the measurement of these relatively thin coatings of indium is difficult since the material itself is soft and may be removed in part from the pin or socket during the course of a metallographic examination. As will be apparent from the data of Table I, however, extremely close control of the thickness of the indium is not essential for such successful practice of the invention.

Table I, set forth below, presents data obtained by testing free machining brass (60% Cu, 3% Pb, 37% Zn) taper pin and socket connections in accordance with the invention with varying thicknesses of indium coatings on the surfaces of the pins. As previously noted, good results in accordance with the invention can be obtained with relatively thin coatings. If a substantial time period between initial engagement of the parts and the achievement of a permanent bond is desired, a thicker coating can be used. Table I also shows that the time required for the achievement of a high-strength bond can be shortened by heating the parts to the slightly elevated temperature of 80° C.

TABLE I.—AVERAGE TENSILE PULLOUT FORCE AFTER AGING FOR GROUPS OF TEN TAPER PIN JOINTS MADE WITH INDIUM PLATED PINS

[Pullout force (lb.)]

| | Indium Thickness (Micro Inches) | | | | | |
|---|---|---|---|---|---|---|
| | 24 | | 53 | | 111 | |
| | Aging Temperature | | | | | |
| | Room | 80° C. | Room | 80° C. | Room | 80° C. |
| Aging Time (Hours): | | | | | | |
| ½ | | | 40 | 92 | 27 | 38 |
| 1 | 113 | | 48 | 95 | 27 | 38 |
| 6 | 114 | | 86 | 97 | 37 | 47 |
| 24 | 116 | 135 | 73 | 122 | 37 | 70 |
| 48 | 113 | 129 | | | | |
| 72 | | | 84 | 132 | 46 | 112 |
| 96 | 130 | 132 | | | | |
| 192 | 112 | 134 | 101 | 122 | 62 | 123 |
| 384 | 125 | 128 | 113 | 135 | 75 | 130 |
| 720 | | | 127 | 138 | 92 | 145 |
| 1,440 | | | 132 | 150 | 108 | 138 |
| 2,880 | | | 151 | 128 | 133 | 128 |
| 3,172 | 123 | 136 | | | | |

Changes in construction will occur to those skilled in the art and various apparently different modifications and embodiments may be made without departing from the scope of the invention. The matter set forth in the foregoing description and accompanying drawings is offered by way of illustration only. The actual scope of the invention is intended to be defined in the following claim when viewed in their proper perspective against the prior art.

What is claimed is:

1. The method of forming a permanent connection between a pair of interfitting parts, said parts having a metallic surface which will react with indium to form an intermetallic compound, said surface being of a material selected from the group consisting of copper, copper alloys, gold, and silver, said method consisting of the steps of providing a coating of metallic indium on one of said parts, said coating having a thickness in the range of 20 microinches to 150 microinches, and engaging said parts with each other at a temperature in the range of room temperature to 80° C. prior to formation of a significant amount of said intermetallic compound, whereby said intermetallic compound forms on said parts and keys said parts to each other.

References Cited

UNITED STATES PATENTS 3,233,034 1/1966 Grabbe ------------ 174—68.5

OTHER REFERENCES

Grabbe: "Permanent Contacts In Electronic Assemblies," published by Photocircuits Corp., Glen Cove, N.Y., pp. 4 and 5.

DARRELL L. CLAY, *Primary Examiner.*